(12) United States Patent
Griwodz et al.

(10) Patent No.: US 6,681,367 B1
(45) Date of Patent: Jan. 20, 2004

(54) OBJECTS WITH SELF-REFLECTING OBJECT RELEVANCE FUNCTIONS

(75) Inventors: Carsten Griwodz, Darmstadt (DE); Joerg Winckler, Heilbronn (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/456,639

(22) Filed: Dec. 8, 1999

(30) Foreign Application Priority Data

Dec. 9, 1998 (EP) .............................. 98123409

(51) Int. Cl.[7] .............................. G06F 17/21
(52) U.S. Cl. .......................... 715/500; 715/530
(58) Field of Search ................ 715/500, 530; 717/110, 116; 707/5; 706/48, 45, 50, 53

(56) References Cited

U.S. PATENT DOCUMENTS

| | | | | |
|---|---|---|---|---|
| 5,418,888 A | * | 5/1995 | Alden | 706/48 |
| 6,029,195 A | * | 2/2000 | Herz | 725/116 |
| 6,070,176 A | * | 5/2000 | Downs et al. | 715/513 |
| 6,121,969 A | * | 9/2000 | Jain et al. | 345/850 |
| 6,377,956 B1 | * | 4/2002 | Hsu et al. | 707/104.1 |
| 2002/0052898 A1 | * | 5/2002 | Schilit et al. | 707/530 |
| 2002/0080180 A1 | * | 6/2002 | Mander et al. | 345/769 |

* cited by examiner

Primary Examiner—Stephen S. Hong
(74) Attorney, Agent, or Firm—Owen J. Gamon

(57) ABSTRACT

The invention relates to objects within a computer-system said objects comprise object data and the invention relates to a specification of an object-specific, self-reflecting relevance-function associated with the objects. The specification of the relevance-function allows an object-exploiter to evaluate an object-relevance at a certain point in time without inspecting the object-data.

40 Claims, 2 Drawing Sheets

| data | 5*exp((t-542)2/202) |
|------|--------------------------|

| data | int Relevance ( )<br>{<br>int currentRelevance;<br>⋮<br>return currentRelevance;<br>} |
|------|------------------------------------------------------------------------------------------|

OBJECTS WITH SELF-REFLECTING OBJECT RELEVANCE FUNCTIONS

FIELD OF THE INVENTION

The present invention relates to objects within computer systems and the reflection of their relevance during their lifetime.

BACKGROUND

More and more storage of computer systems is filled up with data objects (an object according to the current terminology refers to any kind of related data treated as a unit) for which nobody can judge their relevance. In many cases it is completely unclear whether these objects can be migrated to some sort of external storage or even if these objects may be deleted. The increasing flood of data available through the Internet is even escalating the problem of judging the relevance of objects. All types of storage are affected by this problem: files within file systems, entries within databases, entries within caches and so forth.

Storage within computer systems is frequently filled with data for which one knows that it changes its relevance over time, independently of being used or not, but the aging characteristics are unclear in general and in specific with respect to a certain data object. Aging characteristic, according this description, is understood as the characteristic behavior of increase and decrease of an object's relevance during its lifetime. Since the maintainer of the storage, being either a person or some software that maintains the storage, is frequently oblivious to the relevance properties of the data that is stored, removal decisions are made on the basis of various heuristics and assumptions.

One state of the art approach in this area is to use a timestamp, for instance the creation time or the last modification time of an object, as an indication of relevance. This is a rather unsatisfactory approached as the creation time is not connected to the importance of an object. Moreover, knowing the last modification time of and object does not allow to deduce its importance in the future. Any kind of timestamp gives no indication whether the relevance of an object will increase or decrease in the future. Finally such approaches have the disadvantage of trying to deduce relevance from an organizational parameter of the storage system and not from the data itself Another state of the art approach can be found within cache systems being used for instance as second or first level caches for processors. Objects in such environments are tagged with a reference count indicating the access frequency during a previous time interval. The same disadvantages as discussed above do apply to this case as well. Even if a reference count would reflect some indication of relevance, this would represent a relevance indication relating to the past and not to the future. As further disadvantage access to the data, comprised within the object, and inspection of this data is involved.

SUMMARY

The invention is based on the objective to propose a flexible and improved mechanism for estimating the relevance of objects stored within all types of computer storage.

The objectives of the invention are solved by the independent claims. Further advantageous arrangements and embodiments of the invention are set forth in the respective subclaims.

The invention relates to objects within a computer-system. Said objects comprise object data and the invention relates to a specification of an object-specific, self-reflecting relevance-function associated with the objects. The specification of the relevance-function allows an object-exploiter to evaluate an object-relevance at a certain point in time without inspecting the object-data.

Due to the current invention it has become possible that already the object creator/provider can incorporate his knowledge of the data relevance into the object. It also has become possible to model the future variation of an object's relevance and importance; gradual changes over time of the relevance of an object can be modeled. It is not necessary to access and interpret the object's data to estimate its relevance; thus time consuming data accesses to unimportant data can be avoided completely. As relevance functions allow to model the future relevance and importance of an object, new pro-active replacement strategies for these objects, stored within some physical storage, became possible.

DESCRIPTION OF THE PREFERRED EMBODIMENT INTRODUCTION

Storage within computer systems is frequently filled with data that changes its relevance, independently of being used or not. Since the maintainer of the storage, being either a person or some software, is frequently unaware of the relevance properties of the data that it controls, its removal decisions are made on the basis of various heuristics and assumptions.

However, the relevance of objects and their aging characteristics is very much application-specific and frequently known before insertion into the maintained storage, frequently even at creation time. This knowledge generally known by the object creator or object provider is lost or cannot be transferred together with the object and its comprised data (for instance because of technical reasons) into the storage were the object is maintained and provided for access by exploiters.

Figure 1:
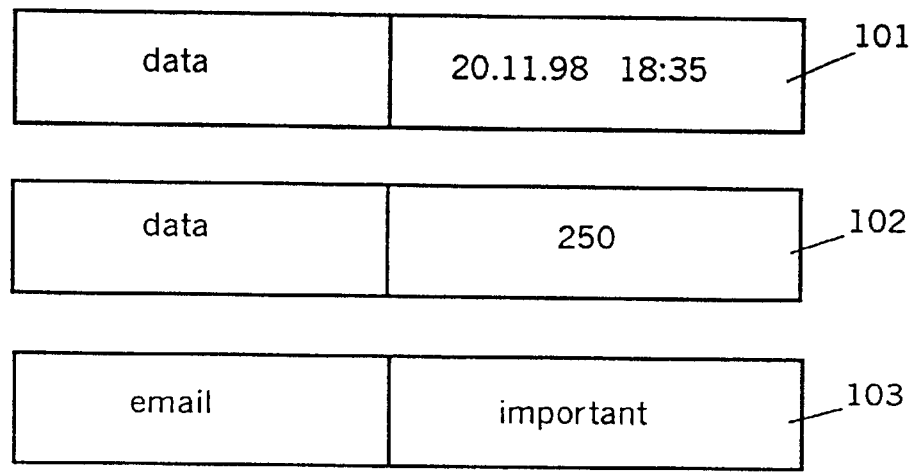
FIG. 1 is a diagram reflecting certain state of the art approaches and heuristics to handle the relevance problem approximately.

Certain state of the art approaches based on various heuristics and assumptions are visualized in FIG. 1. (101) shows a data object with a timestamp, exploited by an some heuristics to guess the relevance to that object. Another approach is based on the reference count, which indicates the number of accesses during a previous time interval. (102) in FIG. 1 is such an example. The data for instance might represent a certain web page in the Internet for which 250 accesses occurred within the last 24 hours. A further example is reflected by (103) within FIG. 1, showing an electronic mail with a static relevance indicator of "Important".

With the exception of the email example, all of these heuristics do not allow the creator or provider of the object (probably the only instance being actually able to judge the object's relevance) to augment the object by his knowledge on relevance. Relevance estimates based on organizational parameters, like a reference count, facilitate a picture of the past only. Erroneous accesses also contribute to this heuristic of "relevance" measure. Even worse, none of the state of the art approaches is able to model the future relevance and importance of an object. It is out of the scope of the state of the art to model the relevance of an object changing gradually over time; in other words, the desired relevance indicator should be a relevance function (as suggested by the current application) covering also the future, rather than a simple relevance value. In addition it is very important that it is not necessary to access and interpret the object's data to estimate its relevance; it is highly desirable that a relevance indicator allows to judge an object's relevance without accessing its data as the relevance indicator should enable an applications to optimize its data access. Time consuming data accesses to unimportant data should be avoidable completely.

To cope with the above mentioned problems the current invention allows the creator and/or provider of a certain object to indicate his knowledge on the object's aging characteristics, i.e. the characteristic behavior of increase and decrease of an object's relevance during its lifetime. To account for this knowledge, the current invention suggests to introduce the transfer of additional information with such objects that makes them self-aware of their aging characteristics. This information can then be used by all exploiters of such objects. For instance a maintainer of a storage system could use these new relevance indicators to support removal processes and replacement policies of the storage system. The current invention proposes to attach such information in the same way as typical file attributes like name, age and origin are attached to objects.

Moreover the current invention proposes an extended approach allowing a user of such relevance tagged objects to modify an object's relevance indicator. This allows a certain user to protect himself from overestimates or underestimates of an objects relevance added by the object provider. Thus the user has complete control over the aging characteristics received from a provider and can potentially protect himself from a provider who may have "aggressively termed" (overestimated) to take precedence over competitors' objects.

Objects With Self-Reflecting Object Relevance

The current invention introduces a scheme of object self-reflection, which allows the person or application that uses or maintains the available objects in a storage to communicate with the stored object to evaluate its relative importance at a certain point in time. It is suggested that additional information is attached to the objects in the same way as attributes like name, age or origin are attached to such objects today but which are less meaningful for evaluation of an object's relevance.

The invention suggests to pre-define the object's relevance not only by a simple static value, which can be correct for a certain portion in time only. Instead a relevance function is introduced allowing to determine the relevance over the complete time spectrum. This approach allows to pre-define the relevance based on the semantics of the data comprised by the object. As will be seen below, the current invention supports the definition of any type of relevance function.

This is of great importance as it can be expected that the aging characteristics of objects will vary tremendously depending on the objects semantics. Statistical models and investigations on longer-term aging characteristics in computer-related areas are very rare. There are certain hints indicating similarities to life-cycle curves that are also observed for products in economical studies at their specific pace. The assumption is supported by the observation that a product life-cycle behavior leads to usage probability distributions according to the Zipf distribution at a given point of time. Nevertheless huge variations of the relevance functions can be expected due to the diverse nature of the object. For instance on-demand news clips can be expected to show a very fast pace rate with respect to aging. Relevance patterns that behave like product life-cycles are not the only possible variation, a wide variety of different patterns may apply e.g. for e-mails. Web documents are probably much more diverse in this respect. Deadlines and announcements for meetings or lectures can be modeled with a constant or increasing relevance and an immediate loss of relevance once the event is taking place. Security warnings increase in relevance as the knowledge about a system vulnerability spreads and the circles of potential attackers grow. All of these diverse relevance characteristics have to and can be modeled by the current invention.

Various implementation options are suggested by the current invention. It has to be stressed that the various implementation options much more reflect a logical view. The physical view, i.e. the question how the object data and the relevance indication are actually stored (for instance together or separately but connected by some pointers mechanism, in a file or a database etc.) is actually determined by the physical nature of the actual storage used. The following details much more concern the way in which the additional information is encoded for interchange between originator and maintainer of the data object. It does not concern the way in which this information is stored by the maintainer, since this is highly application- and system-specific. The current invention allows to a exploit any kind of storage to maintain the objects.

Relevance Functions Encoded by Parameters

Application domains have characteristic aging behavior for some of the data that are stored in this domain. This aging behavior can be expressed in a function that is well-known within that specific domain, that applies to all objects that need storage within this domain, but that needs to be filled with the specific parameter values of an object to compute the specific object's relevance at a given time. The storage system implements this evaluation function and parametrizes it with the values that are attached to the object to perform the computation. Thus according this type of implementation the relevance function is encoded as one or more parameters parameterizing a pre-defined class of functions. This list of parameters is associated with a concrete object. The exploiter of the object, knowing the parameterized class of relevance functions in advance, uses the concrete parameters to construct the concrete relevance function and thus is enabled to calculate the object's relevance at any point in time.

Figure 2:
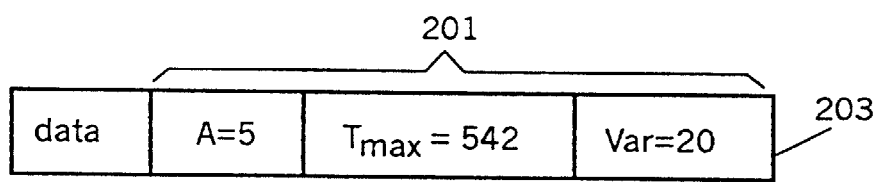
FIG. 2 depicts an example of an relevance function encoded by parameters.
Figure 2:
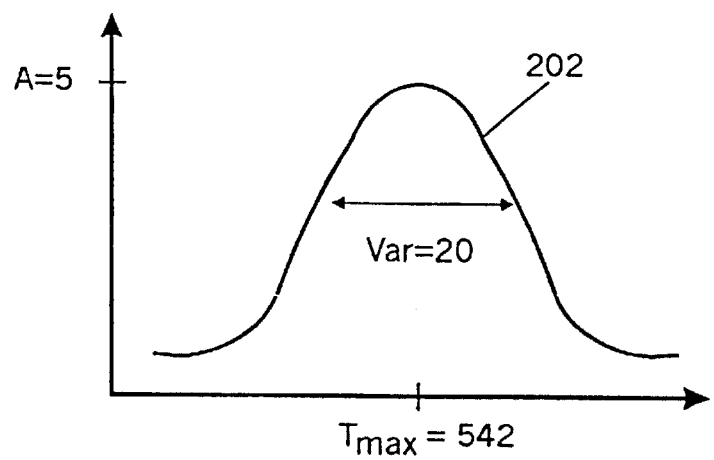

FIG. 2 gives an example of an relevance function encoded by parameters. Visualized is an object (203) associated with a relevance function encoded as a list of parameters (201). This example encodes a simple Gaussian distribution as a collection of relevance function:

$$Ae^{\frac{(t-T\max)^2}{Var^2}}$$

Over time the object's relevance is increasing up to a certain point in time (t=542) and then decreases again.

Advantages relate to the simple encoding imposing small data overhead only and allowing for optimized evaluation. On the other hand this implementation approach covers only a single application domain (resp. limited number of application domains) as a common understanding on the parameterization of the relevance function has to be achieved between the object provider and the object exploiter.

This approach can be further refined if one of the encoding parameters selects a certain class of relevance functions from a larger set and the other encoding parameters finally customize the selected relevance function class resulting in a specific relevance function.

As another example in the news-on-demand or video-on-demand area, a product life-cycle function would be applicable which is characterized by the steepness of increase and decrease of its relevance, the peek relevance and a sustained relevance to account for any relevance that remains after the decline of initial interest.

Considering that receivers/exploiters of the objects may have a different general impression of the importance of objects of a particular type, e.g. news clips by a specific author, certain modifiers should be supported in the parameter set (201), that perform generic manipulations on the input and on the output of the relevance function and thus allow to adjust the relevance function to the organizational needs. Since this is at the discretion of the receiver, these manipulation functions can be arbitrary.

Relevance Functions Encoded as Formulas

For the most cases and applications a set of mathematical functions may easily describe the relevance behavior in time. Thus a set of parameters together with a function identifier may be used to code the individual relevance behavior of an object over time.

A conceivable way of transporting these formula is a string representation that is complemented with parsers at the storage maintainer's side of the transmission which allow the transformation of the given string into an more appropriate local representation. The implementation of basic mathematical functions may differ between systems but a set of basic functions has, e.g., been defined by the POSIX standard that is widely supported. Moreover the relevance function can be calculated by interpretive execution of the encoding formula.

Figures 3, 4, 5:
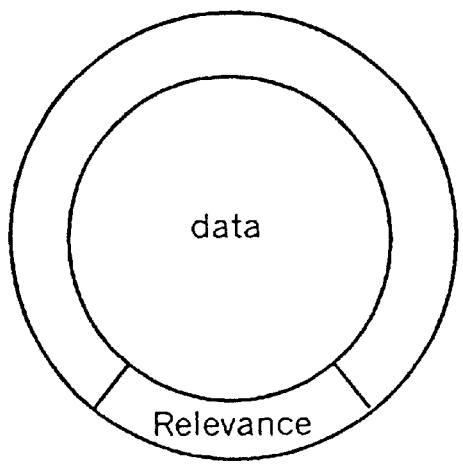
FIG. 3 reflects the same relevance function as in FIG. 2, but now encoded as a formula evaluated by interpretation.
FIG. 4 is a visualization of a relevance function "Relevance" implemented as a method of an object according object oriented technology.
FIG. 5 depicts an embodiment of the current invention using a scripting language for both, specification and implementation of a relevance function.

FIG. 3 reflects the same relevance function as in FIG. 2, but now encoded as a formula evaluated by interpretation.

This implementation approach has the advantages of simple and powerful encoding of mathematical functions which can be easily evaluated. On the other hand the amount of parameters that are inserted must be limited. Moreover standardization is required to share the understanding of supported functions.

Relevance Functions Encoded as OO-Methods

In case the object is an object according to object oriented technology the relevance function is implemented as the method of the class that particular object is an instance of An exploiter of the object could simply call the relevance method for determining the current object's relevance.

This implementation approach significantly increases flexibility as almost any type of processing can be incorporated into the relevance method, no matter how complex the calculations may be.

FIG. 4 is an visualization of a relevance function "Relevance" implemented as a method of an object according object oriented technology.

Relevance Functions Encoded as Graphical Description

Especially in areas where also untrained users want to specify the relevance behavior over time a graphical representation like spline curves or a set of polygons may be appropriate and associated with the object.

The provider of the relevance information can then use graphical tools for specifying the aging behavior, and bases of the curves are attached to the object as relevance behavior.

This approach has the advantage of being very intuitive allowing very user-friendly mapping with GUI tools. As a disadvantage larger amounts of descriptive data are required and the encoding is applicable only to a restricted set of application domains. Also standardization for specification of the relevance functions is required.

Relevance Functions Encoded in a Scripting Programming Language

Arbitrary code can be written in a platform-independent scripting language (Java is currently the best known example being available on an almost any system) for implementation of a relevance function. The advantage of this approach is that the programing code of the relevance function that comes with the object can be extremely flexible. The relevance function can even communicate with the system to better determine its relevance with respect to the environment. For example, code might be allowed to determine a receivers personal preferences or to evaluate access characteristics of objects from the same information area. In this case, the object could more correctly determine its own relevance in the specific storage. Or as a further extension various objects could communicate with one another to determine the individual relevances within their common context by a kind of voting process.

The advantage of extreme flexibility is accompanied with potential problems raised by security and privacy issues. Of course certain standardization with respect to the script language and its supporting libraries is required. Even in case of Java, being established as defacto standard, additional privacy considerations are required being base on the reasonable rule of "not trusting the sender's confidentiality".

FIG. 5 depicts an embodiment of the current invention using a scripting language for both, specification and implementation of a relevance function.

Dynamic Modifications of Relevance Functions

Once the mechanism of relevance functions associated with objects has been introduced a further degree of freedom and flexibility is achievable by modifying the relevance function during the lifetime of its associated object.

For example an object can register every access to its comprised data and depending on access frequency and excess patterns the relevance function could be adapted by the object itself. Another possibility is that exploiters of an object, having access of to said object's relevance function specifications, could adapt this relevance function due to additional knowledge available to the exploiter.

Re-Mapping Relevance Functions

Certain object providers might overestimate or underestimate an object's relevance. If such a situation is detected by the exploiter, for instance by inspection of the relevance function, the current invention suggests the introduction of re-mapping of the relevance function by the exploiter. By this approach it is also possible to map the relevance values onto a comparable range; actually this corresponds to a kind of normalization of relevance values making the relevance values of objects within larger sets more comparable.

Application Areas for Objects With Self-Reflecting Relevance

In the following, some applications of objects with self-reflecting object relevance functions are presented. Since the terms storage space, storage maintainer and origin/provider have been used for above description, these three roles will be identified initially for each application.

Cache Systems

Origin or object provider is in this application case any application handling any number of information units. As storage any type of limited physical storage space can be envisioned. The maintainer is a cache controller.

Due to the limited amount of physical storage, replacement strategies are most important to improve overall system performance. The relevance function indicated by the cache objects themselves could help to further improve the cache replacement strategies. Cache replacement strategies according to the current state of the art completely rely on the reference count mechanisms, which reflect the past situation only. If the relevance functions of the cache objects are evaluated a completely new cache behavior can be realized. As the relevance function reflects an object's importance not only for the past but also for the future, a cache system can manage the physical storage in a proactive and prefetching way. Even more it is now possible to direct the cache system to keep a certain cache object within physical storage even though the object shows a low reference count. As the relevance function reflects that the object is of importance on other grounds to be available within physical storage for improved responsiveness, the cache system is not deceived to move the object into a lower level of the storage hierarchy.

The current teaching may be applied to all types of cache systems.

News-On-Demand—Push Model

Origin or object provider is in this application case some type of news editor. As storage any type of physical storage space optionally combined with a database management system can be used. The maintainer is some type of client software.

News-on-demand is delivered in a wide range of encoding and packaging variations such as text, hypermedia, video or multimedia, and via a large set of transport mechanisms such as e-mail, web access, broadcast object carroussel or "push-channels".

For the "push-model" variant of the news-on-demand example, storage space is used on the receiver's system, which must be reclaimed when the user does not purge (or save) read stories manually. This is typically handled by such systems by purging in FIFO order (an extremely simple heuristic to treat object relevance without having relevance functions available). The push model is the preferred way of delivering news for subsequent disconnected operation. The system of a customer, typically a laptop, receives and stores the news while it is connected. The customer disconnects the system and reads the news while in disconnected operation. In contrast to a LAN-operated machine, such a disconnected system is typically very restricted in the amount of storage that can be wasted and the application of the current invention reclaims the space in a more appropriate way; based on the determination of an object's relevance by calculating its relevance function it becomes possible to keep the most important (i.e. the "most relevant") objects in the limited storage only, while deleting less important objects from the storage.

News-On-Demand—Pull Model

Origin or object provider is in this application case some type of news editor. As storage a sorted list of news items can be imagined. The maintainer is some type of layout algorithm presenting and sorting the set of these items in a most appropriate order sequence.

For the "pull-model" variant of the news-on-demand example, like web access, the proposed scheme would not directly affect storage space. However, these schemes are typically used in such a way that a customer is presented with a series of news documents according to its preferences. The layout may be a simple sorted list or a more complex layout that arranges articles based on their relevance.

Using the self-reflective knowledge of an object's relevance, relevance characteristics can be included in a document's ranking and the document can ultimately allow its removal from the set of offered documents. Applying the terms that have been used in this text so far, the system that presents the news overview to the customer represents the storage maintainer. The storage that is maintained in this case is a limited number of weighted slots in the presentation of news offerings that are made visible to the customer by the news reader system. The presentation itself is flexible and independent of the weighting mechanism based on evaluation of the proposed relevance function itself.

Distributed Video Archive

Origin or object provider is a video editor. As storage physical storage space containing the individual videos can be envisioned. The role of the maintainer is taken over by a program implementing a replacement strategy.

Distributed video archives can consume large amounts of storage space that is wasted if irrelevant data is replicated. The current approach to this is the central administration of the storage space on all nodes of the archive. This kind of centralized architecture inhibits the world-wide dissemination of the technology. Moreover, if every node has to have all videos available the problem of limited storage is even increased. Products such as IBM Digital Library with Video Charger, Cisco IP/TV or Starlight StarWorks represent this approach which is based on a central collection of knowledge.

At the same time, standardization efforts aim at the opening of these systems to interoperation by standardizing protocols and file formats (RTP, RTSP, ASF). If this interoperability is achieved, the result is very likely a decentralized operation where the location of content is driven by rights (copyright, access permissions), as well as user demand. While demand is an important factor for the number and location of replicas, further information that is attached to the data object (a video object in the current case) can be exploited by the decentralized system.

In case of commercial video-on-demand, for example, movies that must not be shown at daytime in a video-on-demand system need not be kept in head-end servers during this time. Heavily advertised movies show an access burst immediately after publication; a system that is based on established caching policies is unable to pre-distribute the content before it is made accessible to the public on a common release date (the idea of pre-distribution of movies before their release date has also been adopted by the DAVIC consortium).

By including other kinds of meta information into the computation, a system can prefetch those video objects that best fit with the current interest of its users; this may be very interesting to schools where the topic of a seminar invokes a short-term interest of pupils in all content that is related to a specific topic. All of the information that is relevant for decision-making thus could be incorporated into the relevance function tagged to the video object. These types of meta information would allow to influence a video's "relevance" controlling a providers strategy to pro-actively make video objects available for optimization of performance.

Electronic Mail

Origin or object provider can be in this application example a (software-assisted) mail author or receiver. As storage normal physical storage space can be envisioned. The maintainer may be mail server daemon.

Electronic mail is the delivery service for various kinds of data. The relevance of a specific mail item is not reflected by the mail itself in any way, except for the (purely static and unchangeable) priority assignment that is provided by the sender. The mail itself remains time-independent.

Even if an approach for the attachment of relevance information to e-mail cannot be implemented in e-mail systems in general, the relevance information can still be attached to the document by the receiver himself In a variety of ways, the personal mail archive that many people keep is inefficient. It is an eternal list of mails, where relevant information gets lost easily or is quickly forgotten, while the bulk of messages remains in the system although they are irrelevant. Some examples:

invitations tend to loose relevance quickly, usually at a specific date, after which the invitation is irrelevant,
  announcements have a limited relevance that is often unpredictable, but denouncements are made as well, which carry the information for earlier announcements,
  some personal mail has no relevance anymore, and the following mail of the same origin is a perfect update of the last one,
  e-mail discussions are frequently compiled into archives or other electronic documents which makes the original e-mails redundant after their publication.

In all these cases relevance functions associated to the email objects can help to improve occupation of the limited physical storage. Moreover the relevance functions are able to improve presentation of the email objects by sorting emails according to their relevance.

Personal Document Repository

Origin or object provider can be in this application example the document owner himself. As storage normal physical storage space can be envisioned. The maintainer may be a daemon process.

As an extension to the last example documents could detect their own relevance over time and thus could support users in archiving or in the management of regular tasks. Each object could register every access to its data contents and could depending on the access frequency or other access patterns (for instance periodic access variations etc.) adapt its relevance function. For example, two objects may not be used anymore for a month. One object is a document which was written once, printed or sent and then never used anymore. The other one may be a template for a monthly report. If the documents would trace their relevance over time the former one would suggest to the user that it should be archived while the latter one would contact the text processing program to add itself to the list of important documents because it is time for the monthly report.

Relevance Driven Notification Service

Origin or object provider can be in this application example a sending person or process. As storage normal physical storage space can be envisioned. The maintainer may be daemon process.

A relevance-driven notification service receives information objects (emails, tasks, appointments, etc.) which can express their own relevance on demand. The notification service offers the user the information objects appropriate to its actual relevance.

From time to time the notification service requests the information objects to update their relevance status. In case of a change of relevance of an information object a hierarchy of escalation steps related to the relevance can be passed through to notify the user (e.g. email, urgent email, fax, contacting the secretary, calling the pager or mobile, calling at home, . . . ).

What is claimed is:

1. A computer system, comprising:
   storage; and
   an object stored in the storage, wherein the object comprises:
   object data, and
   a specification of an object-specific, self-reflecting relevance-function associated with the object, wherein the specification of the relevance-function allows an object-exploiter to evaluate an object-relevance at a certain point in time without inspecting the object data, wherein the object-specific, self-reflecting relevance-function models the object-relevance in a future time-spectrum and the object-relevance varies over the time-spectrum.

2. The computer system of claim 1, wherein the relevance-function is encoded as a set of function-encoding parameters.

3. The computer system of claim 1, wherein the relevance-function is a function-formula, executable by interpretation.

4. The computer system of claim 1, wherein the relevance-function is a executable function-program.

5. The computer system of claim 1, wherein the object is an object according to object-oriented technology and the relevance-function is a method of the object.

6. The computer system of claim 2, wherein the function-encoding parameters further comprise:
   a function-identifier; and at least one function-modifier.

7. The computer system of claim 2, wherein the relevance-function is modifiable by the object-exploiter.

8. The computer system of claim 2, wherein the relevance-function is modifiable by the object itself dependent on access-statistics to the object-data as determined by the object.

9. The computer system of claim 1:
wherein the object is an element in a cache treated as a unity by the cache.

10. The computer system of claim 1, wherein the object comprises a document.

11. The computer system of claim 10, wherein the document further comprises:
a news-document.

12. The computer system of claim 10, wherein the document further comprises:
an email document.

13. The computer system of claim 10, wherein the document further comprises:
a video.

14. A method for administration of an object, comprising the computer-executed steps of:
determining the object-relevance of the object by evaluating an object-specific, self-reflecting relevance-function, wherein the object is associated with the relevance-function; and
migrating said object into a storage of a storage-hierarchy dependent on the object-relevance, wherein the object-specific, self-reflecting relevance-function models the object-relevance in a future time-spectrum and the object-relevance varies over the time-spectrum.

15. The method of claim 14, further comprising:
a reassessment step following the determining step, wherein in response to the relevance function, the reassessment step comprises re-evaluating the object-relevance using an exploiter-relevance function.

16. The method of claim 14, wherein the relevance-function is encoded as a set of function-encoding parameters.

17. The method of claim 14, wherein the relevance-function is a function-formula, executable by interpretation.

18. The method of claim 14, wherein the relevance-function is an executable function-program.

19. The method of claim 14, wherein the object is an object according to object-oriented technology and the relevance-function is a method of the object.

20. The method of claim 16, wherein the function-encoding parameters further comprise:
a function-identifier; and at least one function-modifier.

21. The method of claim 14, wherein the relevance-function is modifiable by an object-exploiter.

22. The method of claim 14, wherein the relevance-function is modifiable by the object itself dependent on access-statistics to the object-data as determined by the object.

23. The method of claim 14:
wherein the object is an element in a cache treated as a unity by the cache.

24. The method of claim 14, wherein the object comprises a document.

25. The method of claim 14, wherein the document further comprises:
a news-document.

26. The method of claim 14, wherein the document further comprises:
an email document.

27. The method of claim 14, wherein the document further comprises:
a video.

28. An apparatus, comprising:
storage readable by a computer system; and
an object stored in the storage, wherein the object comprises:
object data, and
a specification of an object-specific, self-reflecting relevance-function associated with the object, wherein the specification of the relevance-function allows an object-exploiter to evaluate an object-relevance at a certain point in time without inspecting the object wherein the object-specific, self-reflecting relevance-function models the object-relevance in a future time-spectrum and the object-relevance varies over the time-spectrum.

29. The apparatus of claim 28, wherein the relevance-function is encoded as a set of function-encoding parameters.

30. The apparatus of claim 28, wherein the relevance-function is a function-formula, executable by interpretation.

31. The apparatus of claim 28, wherein the relevance-function is a executable function-program.

32. The apparatus of claim 28, wherein the object is an object according to object-oriented technology and the relevance-function is a method of the object.

33. The apparatus of claim 29, wherein the function-encoding parameters further comprise:
a function-identifier; and
at least one function-modifier.

34. The apparatus of claim 28, wherein the relevance-function is modifiable by the object-exploiter.

35. The apparatus of claim 28, wherein the relevance-function is modifiable by the object itself dependent on the access-statistics to the object-data as determined by the object.

36. The apparatus of claim 28:
wherein the object is an element in a cache treated as a unity by the cache.

37. The apparatus of claim 28, wherein the object comprises a document.

38. The apparatus of claim 37, wherein the document further comprises:
a news-document.

39. The apparatus of claim 37, wherein the document further comprises:
an email document.

40. The apparatus of claim 37, wherein the document further comprises:
a video.

* * * * *

UNITED STATES PATENT AND TRADEMARK OFFICE
CERTIFICATE OF CORRECTION

PATENT NO. : 6,681,367 B1
DATED : January 20, 2004
INVENTOR(S) : Carsten Griwodz and Joerg Winckler It is certified that error appears in the above-identified patent and that said Letters Patent is hereby corrected as shown below:

Column 12,
Line 17, "object wherein" should be -- object data, wherein --.

Signed and Sealed this

Twentieth Day of April, 2004

JON W. DUDAS
*Acting Director of the United States Patent and Trademark Office*